(12) United States Patent
De Ponnat et al.

(10) Patent No.: US 10,239,280 B2
(45) Date of Patent: Mar. 26, 2019

(54) SET OF PLATES OR PARTS OBTAINED BY CUTTING A BLOCK OF METAL OR COMPOSITE MATERIAL

(71) Applicant: Mecachrome France, Amboise (FR)

(72) Inventors: Arnaud De Ponnat, Vouvray (FR); Cedric Bonnet, Blois (FR); Olivier Martin, Sainte Genevieve des Bois (FR)

(73) Assignee: Mecachrome France, Amboise (FR)

( * ) Notice: Subject to any disclaimer, the term of this patent is extended or adjusted under 35 U.S.C. 154(b) by 0 days.

(21) Appl. No.: 14/899,662

(22) PCT Filed: Jun. 18, 2014

(86) PCT No.: PCT/FR2014/051515
§ 371 (c)(1),
(2) Date: Dec. 18, 2015

(87) PCT Pub. No.: WO2014/202906
PCT Pub. Date: Dec. 24, 2014

(65) Prior Publication Data
US 2016/0129664 A1    May 12, 2016

(30) Foreign Application Priority Data
Jun. 19, 2013 (FR) ...................... 13 55775

(51) Int. Cl.
*B32B 3/30* (2006.01)
*B23D 57/02* (2006.01)
(Continued)

(52) U.S. Cl.
CPC ................ *B32B 3/30* (2013.01); *B23D 57/02* (2013.01); *B32B 15/01* (2013.01); *E04C 2/08* (2013.01);
(Continued)

(58) Field of Classification Search
None
See application file for complete search history.

(56) References Cited

U.S. PATENT DOCUMENTS 3,943,322 A * 3/1976 Lehmann ................. B23H 7/06
219/69.12
5,163,501 A * 11/1992 Tanaka ................ B29C 33/3842
164/342

FOREIGN PATENT DOCUMENTS

DE    202004007148 U1    9/2004
EP       0266022 A2        5/1988
(Continued)

OTHER PUBLICATIONS

International Search Report of PCT/FR2014/051515, dated Aug. 6, 2014.
(Continued)

*Primary Examiner* — Adam Krupicka
(74) *Attorney, Agent, or Firm* — Banner & Witcoff, Ltd.

(57) ABSTRACT

The present invention relates to a set (1) of plates (2, 3; 12, 13; 21, 22; 41) or parts obtained by cutting a block (4, 4", 4'", 35) of metal or composite material extending around a plane (5) comprising a first plate (2, 12, 21, 41) or part having an upper face (7, 33) and is second plate (3, 13, 22) or part having a lower face (8). The upper face (7, 33) of the first plate (2, 12, 21, 41) or part has a surface (7, 330) having at least two lines of inflection or changing slope with respect to said plane (5), and the lower face (8) of the second plate (3, 13, 22) or part has a surface (8) with a shape complementary to the upper face (7, 33) of the opposite first plate (2, 12, 21, 41) at a more or less constant height, corresponding to the height of the cutting line (34) in the block (4,35).

10 Claims, 3 Drawing Sheets

(51) Int. Cl.
*E04C 2/08* (2006.01)
*E04C 2/32* (2006.01)
*B32B 15/01* (2006.01)

(52) U.S. Cl.
CPC ............ *E04C 2/32* (2013.01); *B32B 2250/02* (2013.01); *B32B 2605/18* (2013.01)

(56) References Cited

FOREIGN PATENT DOCUMENTS

| | | | |
|---|---|---|---|
| KR | 20100067735 A | 6/2010 | |
| KR | 20130036507 A | 4/2013 | |
| WO | 2014072661 A1 | 5/2014 | |

OTHER PUBLICATIONS

Wire Cutting EDM—GF Machining Solutions from France—Milling, EDM, <http://www.gfms.com/country_Fr/en/Products/EDM/wire-cut-edm.html>, retrieved Oct. 2, 2017, 2 pages.

\* cited by examiner

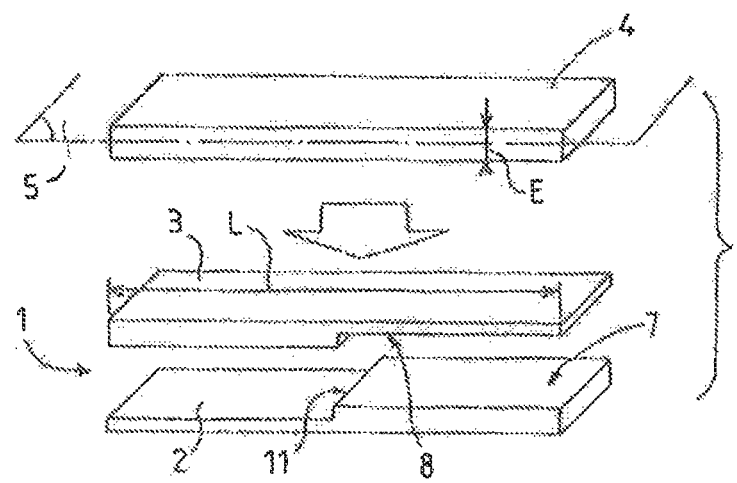
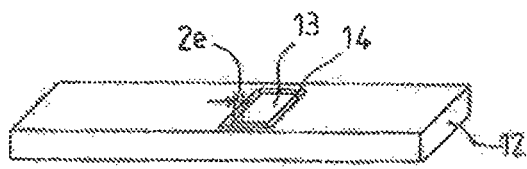
FIG.1
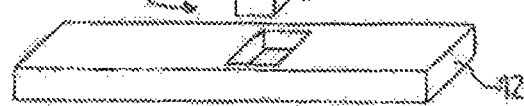
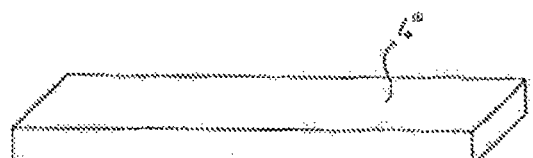
FIG.2
FIG.2A
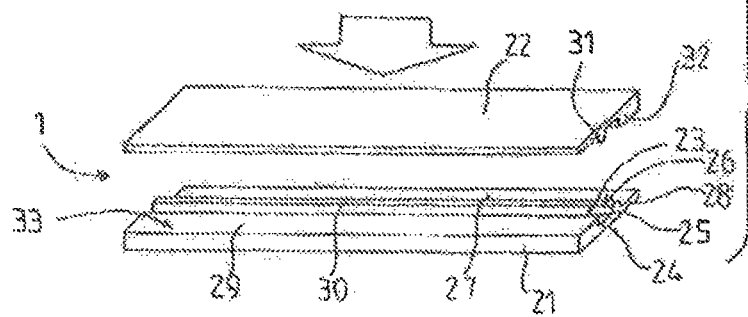
FIG.3

SET OF PLATES OR PARTS OBTAINED BY CUTTING A BLOCK OF METAL OR COMPOSITE MATERIAL

The present invention relates to a set of plates or parts obtained by cutting from a block of metal or composite material.

It finds a particularly important, although not exclusive, application in the field of the rough-cutting of complex cut-out mechanical components, which means to say those with complex shapes and/or surfaces, and high hardness, namely those having a Rockwell hardness in excess of 30. It thus offers rough forms of near-finished parts made of metal (notably aluminum, titanium, steels) or composite material (notably with thermosetting or thermoplastic matrixes and carbon fiber), which can be used for example in the aeronautical industry.

More specifically, and when manufacturing a mechanical component made of metal it is known practice to start with a block of material, referred to as a blank, for example a casting, and then machine it in order in this way to obtain a rough form (semi-finished product) of the desired part. This rough form is then refined to form the finished product.

The nearer the resultant rough form is to the desired final shape, the less rework the part needs and the less material offcuts there are.

There is therefore a need for a set of parts produced with precision from a blank and having complex shapes, and which are as close as possible to the desired final shape of the part, thereby making it possible to limit the number of subsequent steps and the losses of material.

Bladed-saw or chain saw devices suitable for making cuts along determined paths are already known.

However, these devices relate on the one hand to sawing along rectilinear paths and, on the other hand, to the cutting of soft and/or fibrous materials such as wood.

They do not allow complex paths either.

A set of two parts of complementing shapes which is obtained by cutting using a rounded saw blade is also known (DE 20 2004 007 148).

Such a set is necessarily of limited thickness and/or has a length and/or width of reduced dimensions.

Electron-discharge machining or wire-cutting devices, water jet cutting devices or laser cutting devices are also known.

While in these instances these techniques can be used for machining complex shapes, once again they need to be made up of regular surfaces (rectilinear generatrixes) and over small depths (preferably ≤300 mm).

The present invention seeks to provide a set of two plates or parts obtained by cutting which is better able than those previously known to meet the requirements of current practice, notably insofar as it allows machining time to be saved by comparison with the known techniques, insofar as it allows cuts of complex shapes, allowing paths with numerous and closely-spaced direction changes, and does so over part lengths and/or widths of significant dimensions.

Significant dimensions here means dimensions (length, width) of parts to be cut that are greater than 600 mm, for example greater than 1 m, 1 m50 or 2 m or even more.

The thickness of the block from which the parts are cut may, on the other hand, be less than 300 mm, for example less than 200 mm, for example 100 mm, the limit being that of the thickness of the parts desired and the size of the cutting slot.

The present invention also allows a saving of material per part produced (up to 30% by comparison with the prior art) because of the control over the geometry and shape of the cut.

It starts out notably from the idea of imbricating several complex rough forms in the same blank by, in particular, causing a cutting system, not only the cutting part, namely the cutting inserts, but also the guiding part thereof, namely a guide, to work its way progressively into the block.

In order to do this, the invention essentially proposes a set of plates or parts obtained by cutting from a block of metal or composite material extending around a plane, said set comprising a first plate or part having an upper face and a second plate or part having a lower face, characterized in that the upper face of the first plate or part has a surface having at least two lines of inflection and in that the lower face of the second plate or part has a surface of a shape that complements the upper face of the first plate facing it, give or take a constant height corresponding to the height of the cutting line in the block.

Lines of inflection, which more particularly relate to curved parts, also here mean successions of lines of change of gradient in a plane orthogonal to said face and of which the profile (cross section) has successive angles, namely at least two sets of two opposite angles with respect to one and the same side, or of inflection.

In other words, it means a path, for example a straight path, changing direction at least four times in a plane orthogonal to the axial plane, and/or that generates a cutting line with at least two undulations and/or that forms for example angles (for example greater than 5°) with respect to said straight line.

Height means the dimension in the longitudinal plane perpendicular to the plane of the block.

Such manufacture is notably possible by virtue of the introduction of a chain comprising cutting inserts and a guide for this chain in the block of material, namely the blank, and doing so as cutting gradually progresses and over the entire thickness of said block as will be described in greater detail hereinbelow.

This complete introduction, which is allowed by a lateral arrangement for holding a cutting device and the fact that the cutting inserts attack at a normal to the flank of a chain, and do so along the determined path of the chain, allows complex geometries of the cut in the block and therefore of the parts obtained to be achieved in a novel way.

In advantageous embodiments, recourse is moreover and/or also had to one and/or another of the following arrangements:

- the surface of the upper face has at least three changes in gradient to form a rib or a recess;
- the gradient-change angle is 90°;
- the upper face of the first plate has, at least in part, a curved transverse profile;
- the path is at least partially of sinusoidal shape;
- the length of the plates or parts is greater than or equal to 300 mm.

Advantageously, with the cut being made over a part length (depth) greater than or equal to 600 mm, for example greater than 3 m, for example greater than 5 m and/or over a part and/or block width greater than 600 mm, for example greater than 1 m, the parts or the plates obtained have such dimensions;

- the thickness of the set is less than 300 mm;
- the two surfaces facing one another, namely the upper surface and the lower surface, are cut using an endless chain slidably mounted in a guide of constant width corresponding to the height of the cutting line and along a path that is determined so as to give said surface having at least one line of change in gradient with respect to said plane;

the block is cut along the determined path using an endless chain slidably mounted in a guide forming said path, said chain being symmetric with respect to a longitudinal axial plane and being formed of a collection of links comprising on one lateral flank at least one cutting insert with a protruding cutting edge, said cut being made in a direction normal to said flank;

the coordinates of the points on the surface of the upper face (x1(t) and y1(t)) and on the lower face (x2(t) and y2(t)) are defined as follows:

$$\begin{cases} x_1(t) = x_0(t) + y'^0(t) = \dfrac{e}{\sqrt{x_0'(t)^2 + y_0'(t)^2}} \\ y_1(t) = y_0(t) - x_0'(t) = \dfrac{e}{\sqrt{x_0'(t)^2 + y_0'(t)^2}} \end{cases} \quad (7)$$

$$\begin{cases} x_2 = x_0(t) - y_0'(t) = \dfrac{e}{\sqrt{x_0'(t)^2 + y_0'(t)^2}} \\ y_2(t) = x_0(t) + y_0'(t) = \dfrac{e}{\sqrt{x_0'(t)^2 + y_0'(t)^2}} \end{cases} \quad (8)$$

where $x_0$ and $y_0$ are the coordinates of the points $M(x_0, y_0)$ of a path in a frame of reference $Oi, Oj$ and such that:

$$\overrightarrow{OM} = x_0(t)\vec{i} + y_0(t)\vec{j}$$

with $\dfrac{d\overrightarrow{OM}}{dt} = x_0'(t)\vec{i} + y_0'(t)\vec{j}$ and 2e is the height of the cutting line in the block.

In one advantageous embodiment, the set comprises two corresponding plates or parts imbricated one inside the other and obtained from a block of determined thickness.

Advantageously, the set comprises more than two parts, for example three or five parts.

The invention will be better understood from reading the following description of some embodiments given hereinafter by way of nonlimiting examples.

The description refers to the accompanying drawings in which:

FIGS. 1 to 3 are perspective views of sets of parts according to embodiments of the invention.

FIG. 2a is a schematic cross section of another embodiment of a set of plates or parts according to the invention.

Figure 7:
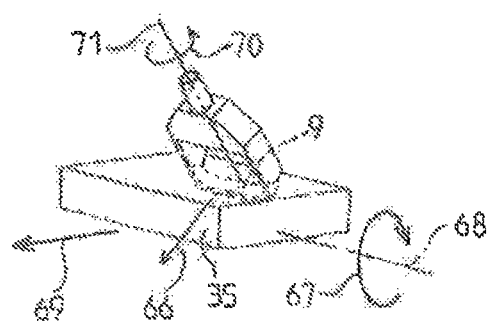

FIG. 7 schematically illustrates another type of block cutting device that can be used to obtain a set according to the invention, illustrating the possible changes in direction about an axis collinear with that of the chain.

FIG. 1 shows a set 1 of two plates 2, 3 obtained by cutting a parallelepidedal block 4 made of metal or composite (for example made of thermosetting resin with carbon fiber) of composition conventionally adopted in the context of the manufacture of airplane structures or parts in the aerospace or automotive field, extending about a plane 5 (in chain line) cut with a device 6 (cf. FIG. 5) comprising a cutting chain described in greater detail hereinafter with reference to FIGS. 5 to 7.

Figure 4B:
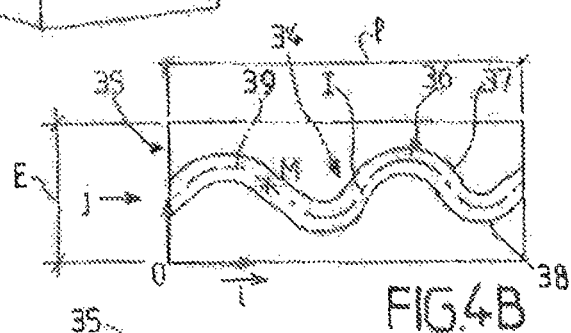
FIG. 4B illustrates the determined path of the cut in FIG. 4A in order to define the parameters thereof.
Figure 4A:
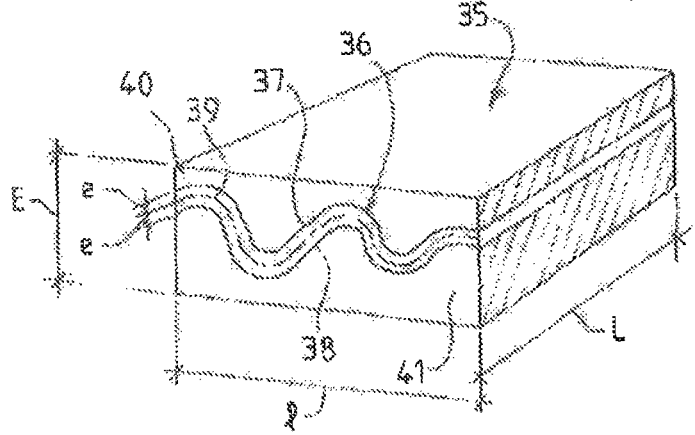
FIG. 4a is a schematic perspective view of one example of a block cut with a device according to the invention, also specifying the length, width and thickness dimensions of a block as used in the context of the present description.

The block 4 is made of metal or composite material of length L, width l and thickness E (cf. also FIG. 4a).

The length L and/or width l of the plates is greater than 300 mm, for example 600 mm.

The thickness E (or height) of the entirety 1 of the block 4 is less than 300 mm, for example less than 250 mm or 100 mm.

According to this embodiment, the two surfaces that face one another, these being the upper surface 7 of the plate 2 and the lower surface 8 of the plate 3, are cut using an endless chain 9 (cf. FIGS. 5, 6) slidably mounted in a guide 10 of constant width corresponding to the height of the cutting line and in a path that is determined so as to give said surface having at least one gradient-change line 11 with respect to the plane 5.

The lower face 8 is of a shape that complements the upper face 7 of the first plate 2, the plates 2, 3 therefore being obtained by cutting the block 4 over a constant height 2e (cf. FIG. 4B).

At the end of cutting, the plates 2, 3 are thus imbricated and distant from one another, the upper 7 and lower 8 faces being parallel but having a step perpendicular to the plane 5, starting from the line 11.

The change in gradient is therefore a double change here and is materially embodied by a plane orthogonal to the face 7, over a determined height.

In the remainder of the description the same reference numerals will be used with indexes to denote elements that are similar and/or identical.

FIG. 2 shows another embodiment of a set 1 of two parts 12, 13, namely a base plate 12 and a small parallelepidedal plate 13 inserted in the recess thus formed, this recess being, for example, a blinded recess.

In this case, a groove 14 is made using a device like the one that will be described with reference to FIG. 7, used like a shovel to detach the block 13.

In the particular embodiment of FIG. 2a, a first lower plate 15, cut from the block 4" using a chain that emerges from and then re-enters the block, the lower plate 15 therefore having plateaus 18 at the upper face 18' of the block 4", is depicted schematically in cross section.

This arrangement makes it possible to obtain several separate upper parts 19, 20 that are complementary of the first plate 15, and do so from the same base block 4".

FIG. 3 shows another embodiment of the invention. Starting from a block 4''', two plates 21, 22 are obtained the complementing facing surfaces of which have a gradient-change path or steps which are orthogonal about several lines of inflection, in this instance the parallel lines 23, 24, 25, 26, 27 and 28.

This then yields a lower part 21 with two reinforcing ribs 29 and 30 running in the longitudinal direction, and an upper part 22 with two ribs 31 and 32 that complement the recesses facing them.

In other words, the surface 33 of the upper face here therefore has at least three changes in gradient, to form ribs 29, 30, 31 and 32 and their complementary recesses on the corresponding faces.

In the embodiments of FIGS. 1 and 3, the cuts in the blocks 4 and 4′″ are made transversely and longitudinally respectively (i.e. one is in the direction of the width l and the other in the direction of the length L).

Another embodiment of a cutting path 34 in a block 35, along a curve 36 of sinusoidal type, has been depicted with reference to FIGS. 4A and 4B.

The coordinates of the points on the surface of the upper face (x1(t) and y1(t)) and on the lower face (x2(t) and y2(t)) are defined as follows:

$$\begin{cases} x_1(t) = x_0(t) + y'_0(t) = \dfrac{e}{\sqrt{x'_0(t)^2 + y'_0(t)^2}} \\ y_1(t) = y_0(t) - x'_0(t) = \dfrac{e}{\sqrt{x'_0(t)^2 + y'_0(t)^2}} \end{cases} \quad (37)$$

$$\begin{cases} x_2(t) = x_0(t) + y'_0(t) = \dfrac{e}{\sqrt{x'_0(t)^2 + y'_0(t)^2}} \\ y_2(t) = y_0(t) - x'_0(t) = \dfrac{e}{\sqrt{x'_0(t)^2 + y'_0(t)^2}} \end{cases} \quad (38)$$

where $x_0$ and $y_0$ are the coordinates of the points $M(x_0, y_0)$ of a path in a frame of reference Oi, Oj and such that:

$$\overrightarrow{OM} = x_0(t)\vec{i} + y_0(t)\vec{j}$$

with $\dfrac{d\overrightarrow{OM}}{dt} = x'_0(t)\vec{i} + y'_0(t)\vec{j}$ and 2e is the height of the cutting line in the block.

In other words, the path 34 of the cutting line 36 of width 2e defines the curves 37 and 38 (spaced apart by 2e) according to the formulae given hereinabove. The cut is also centered on the curve 39, which is the neutral axis of the cut and also coincides with the path 34.

In FIGS. 4A and 4B, the path 34 has several points of inflection I, because of its sinusoidal or substantially sinusoidal shape.

Plates 40 and 41 which imbricate in one another give or take the cutting height along a curved transverse profile are thus obtained from the block 35.

Figure 5:
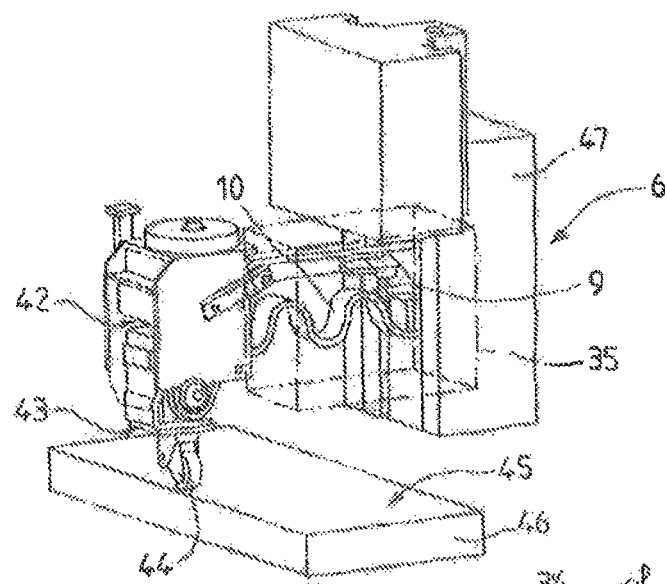
FIG. 5 is a schematic perspective depiction of a cutting device for cutting a set of parts according to one embodiment of the invention.

FIG. 5 shows the cutting device 6 for cutting a set of parts from the block 35 (cf. FIG. 4a and chain line in FIG. 5).

The device 6 comprises the endless chain 9 driven on one side by a rotary ring gear 42 turned by a geared motor unit (not depicted), for example electric, all borne by a supporting carriage 43, and a rolling element 44 to provide the translational movement of the system in collaboration with the surface 45 of a guideplate 46, and the chain 9 is returned by two pinions (not depicted) which may or may not be idlers, that hold the chain apart.

The motor is controlled in a way known per se by a controller (not depicted) so that it cuts with the chosen parameters (cutting speed, feed, etc.).

The device 6 also comprises a support structure 47 supporting the set and measurement means measuring the tension in the chain 9, the speed and/or degree of wear thereof, etc., once again in a way known per se, to which measurements the operation of the controller is slaved.

Figure 6:
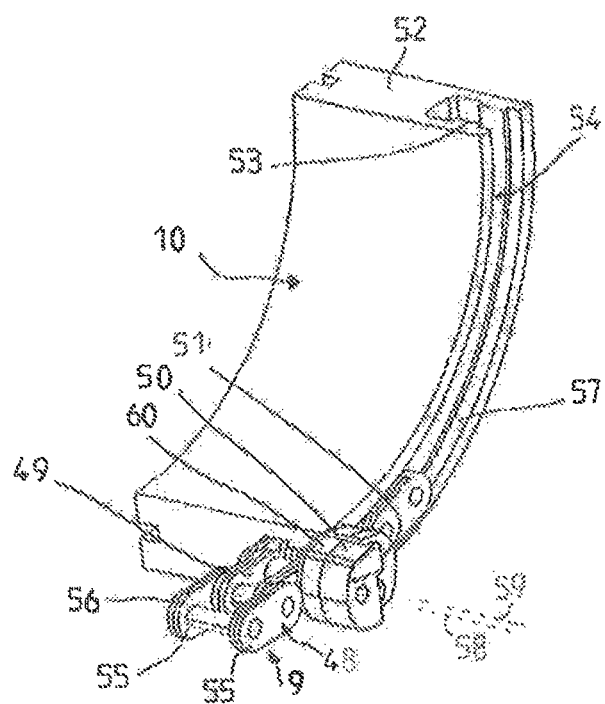
FIG. 6 is a perspective view of a portion of a guide with a chain of the cutting device of FIG. 5.

With reference to FIG. 6, the device 6 comprises the guide 10 along the determined path, this being for example the curve 39 as depicted in FIG. 4B.

The block 35 is thus cut along the determined path 35 using the endless chain 9 slidably mounted in the guide (that forms said path 34), the chain 9 being symmetric with respect to a longitudinal axial plane 5 and formed of a collection of links 48, 49 comprising on one lateral flank at least one cutting insert 50 with a protruding cutting edge 51, said cut being made in a direction normal to said flank.

In the embodiment of the guide and of the chain that can be used to obtain a set according to the invention, which is more particularly described with reference to this FIG. 6, the guide 10 comprises a longitudinal chamber 52 through which the chain 9 passes.

The chamber forms a sheath. The sheath is of determined width H, the insert 50 being positioned to make the cut over the width 2e of cutting line 36 greater than H.

The chamber 52 is provided on one side with a lateral wall 53 holed right through to define a longitudinal slot 54.

The chain 9 for its part comprises several lateral guideplates 55, uniformly distributed along the chain 9. The lateral guideplates 55 have peripheral edges 56 designed to rub (or roll) along the sides 57 of the slot 54 on the external face of the holed lateral wall 53.

More specifically, each articulated link 48, 49 of the chain 9 is formed of two parallel pins 58, 59 joined together by linkplates 60, the lateral guideplates 55 forming some of these linkplates connecting two adjacent pins.

In the embodiment more particularly described here, the chamber 52 comprises two longitudinal ribs 53, 54, namely an internal central first rib 53 designed to roll or rub on the link pins 58, 59 between chain links and a second rib 54 facing the first rib 53, the orthogonal distance between the first and second rib being equal to D (diameter of the pins)+d where d≤0.5 mm, for example <0.1 mm.

With reference to FIG. 7 and with a chain 9 as described, it is possible to cut into the plate or block 35 at multiple angles or directions of attack, and notably in the longitudinal direction, i.e. in a direction normal to the flank of the chain 9 (arrow 66) but also (by pivoting the chain and its guide 10) in rotation (arrow 67) with respect to the longitudinal axis 68 of said chain (which attacks the block 35 in the direction of the arrow 69) like a bucket loader.

A rotation (arrow 70) about an axis 71 perpendicular to the axis 68 also allows other angles of attack.

The manufacture of the set 1 of plates of FIG. 1 using the cutting device 6 of FIGS. 5 to 7 will now be described.

Having chosen the block 4 of metal or composite material corresponding to the parts that are to be manufactured, a controller is used to program the cut that is to be made.

The guide 10 is chosen according to the parameters necessary for manufacture and may for example be designed to be disconnectable and removable so as to allow thicknesses 2e of cutting line 36 of different widths, for example of between 1 cm and 2 cm.

The block 4 is then installed facing a cutting device 6. Cutting is then performed in a way known per se, the lubrication of the chain 9 being performed constantly, for example by injecting a liquid lubricant at various injection points on the guide, these being evenly distributed along this guide.

The block 4 is then fed in, pushed against the saw or, on the other hand, it is the device 6 itself that moves over the workpiece which has therefore been fixed down in a way known per se onto a support (not depicted) beforehand that also serves as a stiffener.

The guide 10 and the cutting inserts are then pushed progressively facing the block 4, little by little separating the upper and lower parts 2 and 3, the chain 9 here being pushed in the transverse direction of the block 4. In the case for example of the manufacture of a plate of the kind indicated in FIG. 3, the saw will in this case move in the longitudinal direction of the plates 21, 22.

As the saw gradually cuts, the chips are removed (for example by a chip breaker).

The plates 2 and 3 are, moreover, progressively grasped and held firm in a way known per se so that they can be removed later.

It is thus possible to obtain two plates 2, 3 of very similar shape with a very small loss of material and/or of metal, namely only the thickness of the cutting line 2e.

These imbricated parts which are very close to the definitive machined shape can then be finalized without too much difficulty.

As goes without saying, and as is incidentally evident from the foregoing, the present invention is not limited to the embodiments more particularly described. On the contrary, it encompasses all alternative forms thereof notably those in which set 1 comprises more than two parts 2, 3, 12, 13, 21, 22, 40, 41 cut simultaneously, for example a set of three parts or even four parts imbricated in one another, in which case the cutting inserts and their guide will be configured accordingly.

In one embodiment, the path of the cutting chain 9 is therefore caused to emerge from the block 4''', 35 and return to it one or more times (as many times as there are parts in addition to the lower part or plate).

The invention claimed is:

1. A set of plates or parts obtained by mechanical cutting from a block of metal or hard composite material, wherein the block extends around a plane, wherein the block has a length, a width and a thickness, wherein the set comprises a first plate or part having an upper face and a second plate or part having a lower face, and wherein the set of plates or parts and the block are characterized in that:
the upper face has a surface with at least two lines of inflection parallel to the length with respect to the plane;
the length is greater than or equal to 600 mm; and
the lower face has a surface of a shape that complements the upper face of the first plate facing it, give or take a constant height corresponding to a cutting line thickness in the block, wherein the cutting line thickness is between 1 centimeter and 2 centimeters.

2. The set of plates or parts as claimed in claim 1, characterized in that the surface of the upper face has at least three lines of inflection to form a rib or a recess.

3. The set of plates or parts as claimed in claim 1, characterized in that a gradient-change angle is 90°.

4. The set of plates or parts as claimed in claim 1, characterized in that the upper face has, at least in part, a curved transverse profile.

5. The set of plates or parts as claimed in claim 4, characterized in that the cutting line follows a path at least partially of sinusoidal shape.

6. The set of plates or parts as claimed in claim 1, characterized in that the thickness of the set is less than 300 mm.

7. The set of plates or parts as claimed in claim 1, characterized in that the two surfaces facing one another, namely the surface of the upper face and the surface of the lower face are cut (a) using an endless chain slidably mounted in a guide of constant width corresponding to the cutting line thickness and (b) along a path that is determined so as to give the surface of the upper face the at least two lines of inflection with respect to said plane.

8. The set of plates or parts as claimed in claim 7, characterized in that the block is cut along the path extending along the width or the length of the block by using the endless chain slidably mounted in the guide forming said path, wherein the endless chain is symmetric with respect to a longitudinal axial plane and being formed of a collection of links comprising on one lateral flank at least one cutting insert with a protruding cutting edge, and wherein the cut is made in a direction normal to the one lateral flank.

9. The set of plates or parts as claimed in claim 1, characterized in that coordinates of points on the surface of the upper face (x1(t) and y1(t)) and on the lower face (x2(t) and y2(t)) are defined as follows:

$$\begin{cases} x_1(t) = x_0(t) + y'_0(t) = \dfrac{e}{\sqrt{x'_0(t)^2 + y'_0(t)^2}} \\ y_1(t) = y_0(t) - x'_0(t) = \dfrac{e}{\sqrt{x'_0(t)^2 + y'_0(t)^2}} \end{cases} \quad (37)$$

$$\begin{cases} x_2(t) = x_0(t) + y'_0(t) = \dfrac{e}{\sqrt{x'_0(t)^2 + y'_0(t)^2}} \\ y_2(t) = y_0(t) - x'_0(t) = \dfrac{e}{\sqrt{x'_0(t)^2 + y'_0(t)^2}} \end{cases} \quad (38)$$

where $x_0$ and $y_0$ are the coordinates of the points $M(x_0, y_0)$ of a path in a frame of reference $Oi$, $Oj$ and such that:

$$\overrightarrow{OM} = x_0(t)\vec{i} + y_0(t)\vec{j}$$

with $\dfrac{d\overrightarrow{OM}}{dt} = x'_0(t)\vec{i} + y'_0(t)\vec{j}$ and 2e is the height of the cutting line in the block.

10. A set of plates or parts obtained by mechanical cutting from a block of metal or hard composite material, wherein the block extends around a plane, wherein the block has a length, a width and a thickness, wherein the set comprises a first plate or part having an upper face and a second plate or part having a lower face, and wherein the set of plates or parts and the block are characterized in that:
the upper face has a surface with at least two lines of inflection parallel to the length with respect to the plane;
the length is greater than or equal to 600 mm; and
the lower face has a surface of a shape that complements the upper face of the first plate facing it, the plates or parts being distant from one another of a constant height corresponding to a cutting line thickness in the block, wherein the cutting line thickness is between 1 centimeter and 2 centimeters.

\* \* \* \* \*

UNITED STATES PATENT AND TRADEMARK OFFICE
CERTIFICATE OF CORRECTION

PATENT NO. : 10,239,280 B2  
APPLICATION NO. : 14/899662  
DATED : March 26, 2019  
INVENTOR(S) : Arnaud De Ponnat et al.

Page 1 of 1

It is certified that error appears in the above-identified patent and that said Letters Patent is hereby corrected as shown below:

On the Title Page

Column 2, under Abstract, Item (57), Line 5:
Please delete "is" and insert --a--

Signed and Sealed this
Seventeenth Day of September, 2019

Andrei Iancu
*Director of the United States Patent and Trademark Office*